United States Patent [19]

Dudzinski

[11] Patent Number: 5,124,684
[45] Date of Patent: Jun. 23, 1992

[54] AUTOMOBILE HEADLIGHT WARNING ALARM SYSTEM

[76] Inventor: Dwight J. Dudzinski, 2733 East St., Oceanside, Calif. 92054-4417

[21] Appl. No.: 728,355

[22] Filed: Jul. 11, 1991

[51] Int. Cl.$^5$ .................................. B60Q 11/00
[52] U.S. Cl. ........................... 340/457.2; 340/457
[58] Field of Search ................... 340/457, 457.2; 307/10.8; 315/82, 83

[56] References Cited

U.S. PATENT DOCUMENTS

| | | | |
|---|---|---|---|
| 3,391,302 | 7/1968 | Weingarden | 315/83 |
| 4,125,824 | 11/1978 | McPherson et al. | 315/80 X |
| 4,194,175 | 3/1980 | Eklund | 340/457.2 |
| 4,862,140 | 8/1989 | Case et al. | 340/457.2 |

Primary Examiner—Jin F. Ng
Assistant Examiner—Brian R. Tumm

[57] ABSTRACT

The headlight warning apparatus is a device which alerts the driver of an automobile that the lighting circuit is energized while the engine is not running. By detecting the ripple voltage produced by the alternator, the apparatus determines whether the engine is on or off. Using this detection scheme, no calibration is required. To facilitate ease of installation in connecting the headlight warning apparatus to the lighting circuits, the headlight warning apparatus can be connected to the lighting circuit without having to determine the voltage polarity present in the lighting circuit. The installation is further simplified as making a connection to the ignition circuit is not required.

4 Claims, 3 Drawing Sheets

AUTOMOBILE HEADLIGHT WARNING ALARM SYSTEM

BACKGROUND

1. Field of Invention

The present invention relates to an automobile headlight and parking light alarm system. More specifically, the present invention is connected to the parking or the headlight circuit and provides an audible alarm to alert the driver that the lights are energized while the engine is not operating.

2. Description of Prior Art

In the past a plurality of alarm devices have been developed to alert the driver that the lighting circuit is energized and the ignition circuit has been turned off. Examples of these devices are U.S. Pat. No. 4,194,175 by Eklund (1980) and U.S. Pat. No. 4,862,140 by Case (1989). To determine that the engine is not running several prior art devices monitor the ignition and lighting circuits as in U.S. Pat. No. 4,194,175 by Eklund (1980). A major disadvantage of these devices has been in their installation whereby the wires in the ignition and lighting circuits need to be correctly identified. Secondly, U.S. Pat. No. 4,862,140 by Case (1989) does not make use of the ignition circuit but monitors voltage levels at the headlight connector wiring to determine if the engine is running or not. This prior art invention uses three or four wires in its alarm to monitor the headlight signals at the connector. The installer must correctly identify the proper voltage polarity to install the device. The device also has the disadvantage of requiring calibration in either a factory environment or by the vehicle owner as wiring voltage drops are more likely to vary with different motor vehicles.

Problems such as identifying correct voltage polarity, calibrating the device and having to hookup to more than one vehicle electrical circuit are solved by the present invention. The first problem of identifying voltage polarity is solved by use of a diode bridge circuit. The need for calibration can be solved by monitoring the alternator ripple voltage. Also, only the circuit to which the alarm is connected is monitored.

SUMMARY OF THE INVENTION

The principal object of the invention is to provide for the driver of the automobile an audible warning that the headlights or parking lights have been left on while the engine is not operating. The headlight alarm system provides a predetermined time delay period when the headlights are initially energized but the engine is off or when the lights remain on after the engine has been turned off. After the time delay period has elapsed the announciator is intermittently energized for another predetermined time period after which the annunciator is turned off indefinitely.

It is the object of the present invention to provide for an easier installation of the device as the voltage polarity present in the lighting system circuits need not be identified. The unit has two unmarked wires. Refer to FIG. 3. The unit can be installed without regard to voltage polarity to a plurality of locations in the lighting circuit. Some installation locations are as follows: 1) The wires leading to the headlight three prong connector, 2) Any of the side marker lights 3) The parking lights, 4) The taillights. There are also two levels of protection that the driver initially selects. The first level of protection involves having the alarm monitor the first position of the headlight switch which energizes the parking, tail and, if provided, the side marker lights. The second level is to have the alarm monitor the second position of the headlight switch which in addition to energizing the parking lights also energizes the headlights. The installation of the alarm in these locations is as follows: 1) Near the three prong headlight connector where the alarm is installed to the low beam and high beam signals or 2) Near the side marker of parking lights where either one of the unmarked wires is connected to the respective signal and ground wires.

It is the object of the present invention to monitor the alternator ripple voltage rather than the alternator's voltage output to detect if the engine is running. Installation is made easier because of the following features. First, the unit's detection circuit need not be calibrated. Also, installation is simplified as the unit need only monitor the lighting circuit as opposed to other systems where both the lighting and ignition circuits are monitored.

DESCRIPTION OF MOST PREFERRED EMBODIMENTS

Figure 1:
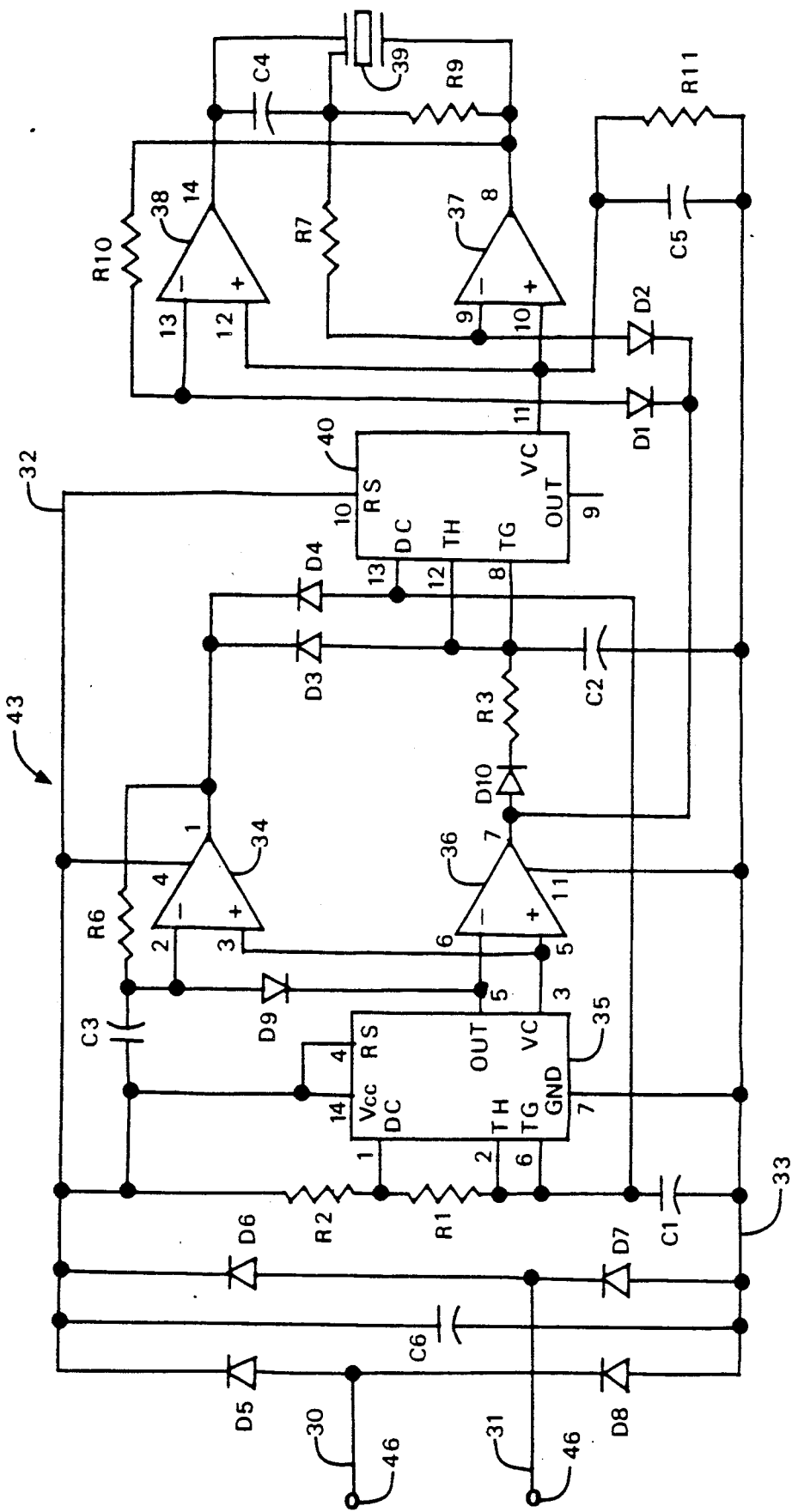
FIG. 1 is the most preferred embodiment of the headlight warning system of the present invention.
Figure 3:
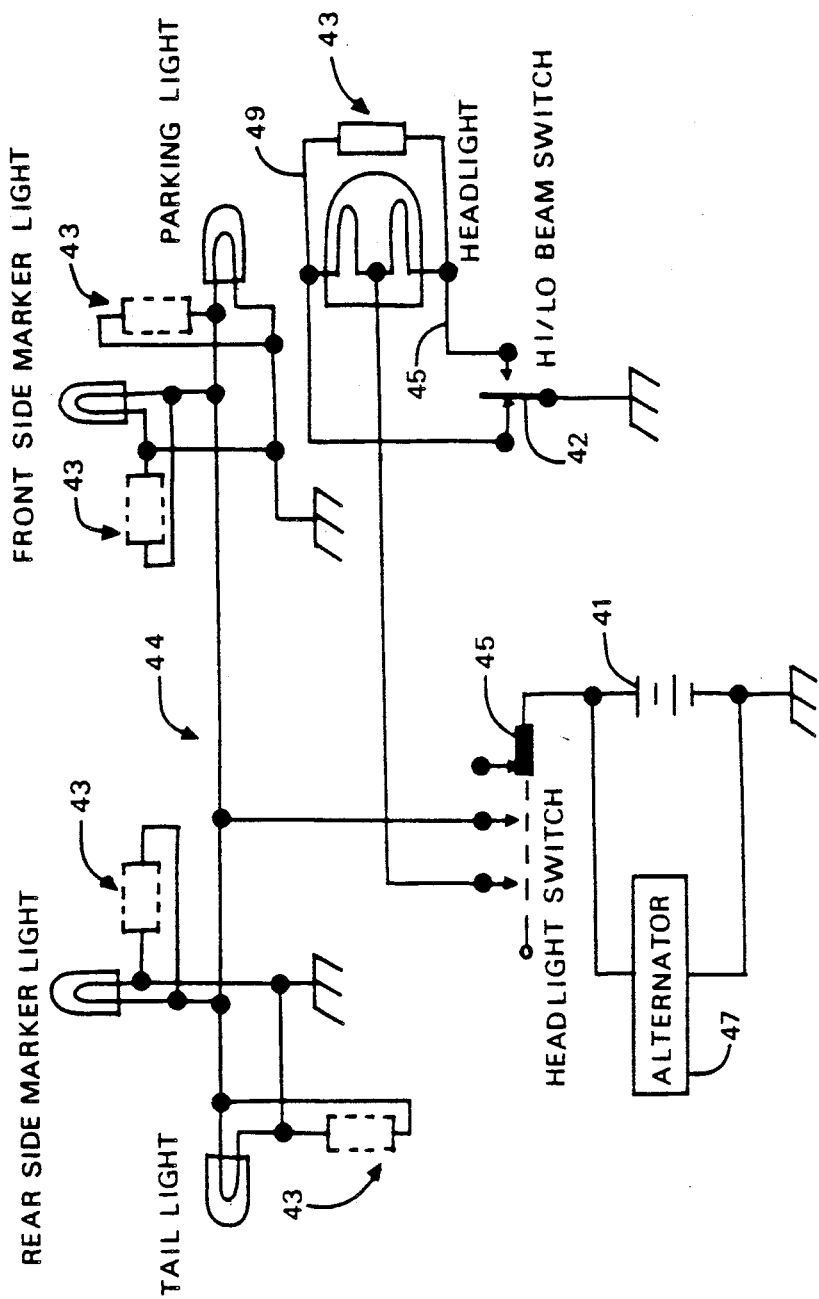
FIG. 3 is a connection diagram of alternate hookup locations of the present invention.

The most preferred embodiment of the present invention is illustrated in FIGS. 1 and 3. The alarm 43 is connected to the existing wiring harness by using insulation displacement connectors 46. The battery 41 whose voltage less its losses, due to wiring resistance, is impressed across a diode bridge, a voltage non-discriminatory circuit, comprising diodes D5 through D8. The lighting system 44 is powered by a battery 41. If a positive voltage is applied to conductor 30 and a negative voltage is applied to conductor 31 then D5 and D7 will be conducting. Diode D5 supplies a positive potential to conductor 32 which is referred to as VCC. Diode D7 supplies a negative potential to conductor 33 which is referred to as VDD. By activating foot switch 42 the polarity at conductors 30 and 31 reverses as the headlight alarm 43 is connected to the low beam conductor 49 and high beam conductor 45. When this occurs Diode D6 supplies a positive potential conductor 32 and Diode D8 supplies a negative potential to conductor 33.

There are two modes of operation in which the headlight alarm 43 may operate. They are as follows: A) The lighting circuit 44 is turned on while the engine is off. This is referred to as Mode I or B). The engine is turned off while the lighting circuit had been left on. This is referred to as Mode II. During Mode I capacitors C1 and C2 have zero volts across them. When a potential exists across conductors 30 and 31, C1 begins to charge exponentially through resistors R1 and R2. First timer 35 pin 3 supplies ⅔ VCC to amplifier 34 positive input pin 3 and amplifier 36 positive input pin 5. Amplifier 34 and resistor R6 function as a unity voltage follower its output pin 1 is ⅔ VCC. Capacitor C3 charges to a voltage of VCC minus ⅔ VCC and passes no AC signal to the negative input pin 2 of amplifier 34. Since amplifier 34 output pin 1 is ⅔ VCC diodes D3 and D4 will only conduct if the anode side has a voltage of ⅔ VCC plus a diode drop. Since diode D4 anode is connected to the junction of resistor R1, capacitor C4, and first timer 35 pins 2 and 6 the exponential voltage attains a maximum of ⅔ VCC and Diode D4 does not conduct. First timer 35 operates as a delay timer and multivibrator as a capacitor C1 charges and discharges between ⅔ VCC and ⅓ VCC. Since capacitor C1 begins to charge from approximately VDD it charges through ⅓ VCC which allows an additional time delay before reaching ⅔ VCC. Upon reaching ⅔ VCC capacitor C1 begins to discharge exponentially to ⅓ VCC as first timer 35 discharge pin 1 is activated. The first timer 35 output pin 5 switches from a high state to a low state when capacitor C1 has charged to ⅔ VCC and remains in the low state until capacitor C1 discharges to ⅓ VCC. During this output low time amplifier 36, an inverter, having its input pin 6 connected to first timer 35 output pin 5, amplifier 36 output pin 7 is then in a high state causing capacitor C2 to begin charging exponentially through diode D10 and resistor R3, also diodes D1 and D2 unclamp amplifiers 37 and 38 allowing annunciator 39 to be energized. During the clamped period annunciator 39 is deenergized, diodes D1 and D2 force both amplifiers 37 and 38 output pins 8 and 14 respectively to a high state, this helps to prevent depolarization of the ceramic piezo electric element 39. When capacitor C1 discharges to ⅓ VCC the first timer 35 output pin 5 switches from a low to a high state, therefore, capacitor C2 stops charging and diodes D1 and D2 clamp amplifiers 37 and 38 by biasing amplifiers 37 and 38 negative input pins 9 and 13 to a low state respectively. As this cycle repeats first timer 35 output pin 5 switches low, capacitor C2 charges toward ½ VCC as resistor R11 and decoupling capacitor C5 biases second timer 40 voltage control pin 11 to ½ VCC. Second timer 40 threshold and trigger pins 12 and 8 respectively monitor capacitor C2. When capacitor C2 charges to ½ VCC second timer 40 output pin 9 (not used) switches low and discharge pin 13 is activated, pin 13 discharges capacitor C1 which latches first timer 35 output pin 5 to a high state. This action forces diodes D1 and D2 to clamp amplifiers 37 and 38 output pins 8 and 14 respectively to a high state effectively deenergizing annunciator 39 indefinitely thus completing Mode I operation. Amplifiers 37 and 38 output pins 8 and 14 respectively provide the drive for the piezo element 39. Resistor R10 couples amplifier 37 output pin 8 to amplifier 38 negative input pin 13. Resistor R7 couples amplifier 37 negative input pin 9 to timing network resistor R9 and capacitor C4. Amplifiers 37 and 38 positive input pins 10 and 12 respectively are connected to second timer 40 pin 11 which is ½ VCC. Diode D9 is used to clamp monitor amplifier 34 output pin 1 to a high state, this prevents pin 1 from switching to a low state during the time annunciator 39 is energized. Diode D10 prevents capacitor C2 from discharging while amplifier 36 output pin 7 is in a low state.

During Mode II operation of the alarm 43 while the engine is running there exists in the electrical system 44 an alternator ripple voltage produced by the alternator 47 which is coupled by capacitor C3 and greatly amplified by monitor amplifier 34. Monitor amplifier 34 pin 1 swings between VCC and VDD as a response to this ripple voltage. When monitor amplifier pin 1 is low capacitors C1 and C2 are discharged through diodes D3 and D4. When the engine has been turned off and the headlights remain on, monitor amplifier 34 output pin 1 is at ⅔ VCC setting the alarm 43 in Mode I operation.

In the event that an automobile has a defective headlight switch 45, capacitor C6 has been incorporated to filter out most static generating conditions but the value of capacitor C6 must be small enough as to not completely attenuate the alternator ripple voltage.

VCC is supplied to first and second timer pins 4, 10 and 14, amplifiers 34, 36, 37, and 38 pin 4. VDD is supplied to first and second timer pin 7, amplifiers 34, 36, 37 and 38 pin 11.

The alarm 43 is encased in an enclosure which provides an opening (a sound cavity) for the piezo element 39. Also a second opening is provided to allow a pair of wires to be connected to lighting circuit 44.

Table I lists component values used in the most preferred embodiment of FIG. 1.

TABLE I

| | |
|---|---|
| announciator 39 | Piezo element with feedback |
| R1 | 220K ohms |
| R2 | 120K ohms |
| R3 | 1 Meg ohms |
| R6 | 1 Meg ohms |
| R7 | 10K ohms |
| R9 | 120K ohms |
| R10 | 10K ohms |
| R11 | 10K ohms |
| C1 | 10 uf |
| C2 | 10 uf |
| C3 | 0.1 uf |
| C4 | .0033 uf |
| C5 | 10 uf |
| C6 | 100 uf |
| first timer 35, second timer 40 | LM 556 |
| amplifiers 34,36,37,38 | LF 347 |
| diodes D1 thru D10 | IN4001 |

DESCRIPTION OF PREFERRED EMBODIMENTS

Figure 2:
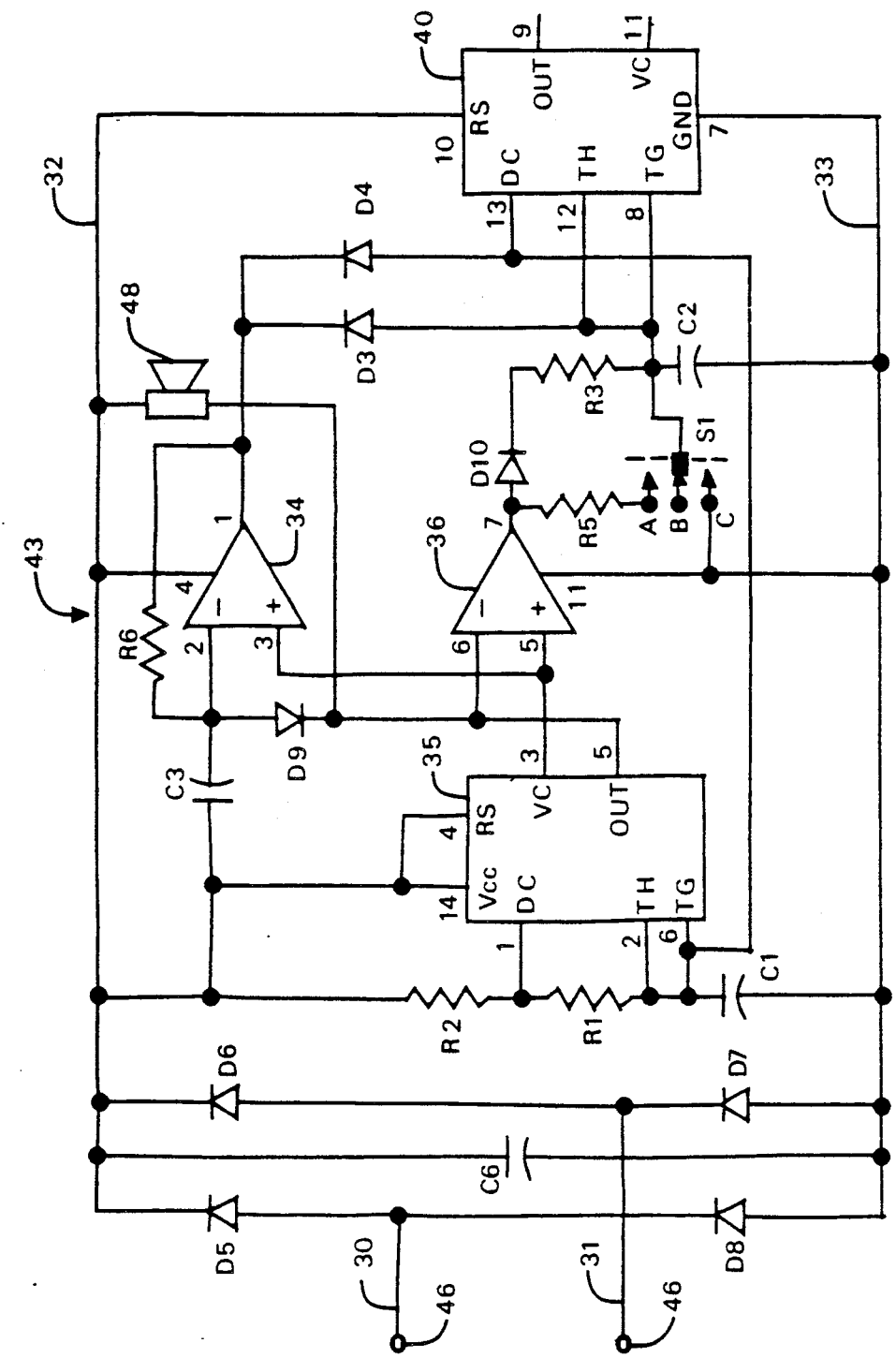
FIG. 2 is the schematic diagram of the alternate embodiment of the present invention.

The preferred embodiment of the present invention is illustrated in FIGS. 2 and 3. The alarm 43 is connected to the existing wiring harness by using insulation displacement connectors 46. The battery 41 whose voltage less its losses, due to wiring resistance, is impressed across a diode bridge, a voltage non-discriminatory circuit, comprising diodes D5 through D8. The lighting system 44 is powered by a battery 41. If a positive voltage is applied to conductor 30 and a negative voltage is applied to conductor 31 then diodes D5 and D7 will be conducting. Diode D5 supplies a positive potential to conductor 32 which is referred to as VCC. Diode D7 supplies a negative postential to conductor 33 which is referred to as VDD. By activating foot switch 42, the polarity at conductors 30 and 31 reverses as the headlight alarm 43 is connected to the low beam conductor 49 and high beam conductor 45. When this occurs diode D6 supplies a positive potential to conductor 32 and diode D8 supplies a negative potential to conductor 33.

There are two modes of operation in which the headlight alarm 43 may operate. They are as follows: A) the lighting circuit 44 is turned on while the engine is off. This is referred to as Mode I or B) the engine is turned off while the lighting circuit has been left on. This is referred to as Mode II. During Mode I capacitor C1 and C2 have zero volts across them. When a potential exists across conductors 30 and 31 cpapacitor C1 begins to charge exponentially through resistors R1 and R2. First timer 35 pin 3 supplies ⅔ VCC to amplifier 34 positive input pin 3 and amplifier 36 positive input pin 5. Amplifier 34 and resistor R6 function as a unity voltage follower its output pin 1 is ⅔ VCC. Since amplifier 34 output pin 1 is ⅔ VCC diodes D3 and D4 will only conduct if the anode side has a voltage of ⅔ VCC plus a diode drop. Since diode D4 anode is connected to the junction of resistor R1, capacitor C3, and first timer 35 pins 2 and 6 the exponential voltage attains a maximum of ⅔ VCC and diode D4 does not conduct. First timer 35 operates as a delay timer and multivibrator. As a multivibrator capacitor C1 charges and discharges between ⅔ VCC and ⅓ VCC. Since capacitor C1 begins to charge from approximately VDD it charges through ⅓ VCC which allows an additional time delay before reaching ⅔ VCC. Upon reaching ⅔ VCC capacitor C1 begins to discharge exponentially to ⅓ VCC as first timer 35 discharge pin 1 is activated. The first timer 35 output pin 5 switches from a high state to a low state when capacitor C1 has charged to ⅔ VCC and remains in the low state until capacitor C1 discharges to ⅓ VCC. During this output low time amplifier 36, an inverter, having its input pin 6 connected to first timer 35 output pin 5, amplifier 36 output pin 7 is then in a high state causing capacitor C2 to begin charging exponentially through diode D10 and resistor R3 while switch S1 is in the B position. While first timer 35 pin 5 is low, annunciator 48 (a piezo element with a self drive) is energized. When capacitor C1 discharges to ⅓ VCC the first timer 35 output pin 5 switches from a low to a high state therefore, capacitor C2 stops charging. As this cycle repeats first timer 35 output pin 5 switches low, capacitor C2 charges toward ⅔ VCC. When capacitor C2 charges to ⅔ VCC monitored by second timer pins 8 and 12 the second timer 40 discharge pin 13 is activated, pin 13 discharges capacitor C1 which latches the first timer 35 output pin 5 to a high state effectively deenergizing annunciator 48 indefinitely when switch S1 is in the B position. Diode D9 is used to clamp monitor amplifier 34 output pin 1 to a high state, this prevents pin 1 from switching to a low state during the time annunciator 48 is energized.

During Mode II operation of the alarm 43 while the engine is running, there exists in the electrical system 44 an alternator ripple voltage produced by the alternator 47 which is coupled by capacitor C3 and greatly amplified by monitor amplifier 34. Monitor amplifier 34 pin 1 swings between VCC and VDD as a response to this ripple voltage. When monitor amplifier output pin 1 is low capacitor C1 and C2 are discharged through diodes D3 and D4. When the engine has been turned off and the headlight remain on, monitor amplifier 34 output pin 1 is at ⅔ VCC setting the alarm 43 in Mode I operation.

Switch S1 is a three position switch, that enables the driver to select three different annunciator 48 timing periods. The three switch positions and their associated timing periods are as follows: A) with the switch S1 in the A position annunciator 48 is sequentially energized. After being reset by a time delay in which resistor R5 discharges capacitor C2 the annunciator 48 will again be sequentially energized. Resistor R5 discharges capacitor C2 to ⅓ VCC. This action deactivates second timer 40 which unlatches first timer 35 causing the cycle to repeat. B) with the switch S1 in the B position the annunciator 48 is intermittently energized for a single time period only. As capacitor C2 is being charged to ⅔ VCC annunciator 48 is intermittently energized. Because diode D10 prevents capacitor C2 from discharging annunciator 48 is intermittently energized for a single time period. C) with the switch in the C position the annunciator 48 is continously sequentially energized. As capacitor C1 cannot accept a charge second timer 40 discharge pin 13 cannot be activated to latch first timer 35 output pin 5 to a high state.

In the event that an automobile has a defective headlight switch 45, capacitor C6 has been incorporated to filter out most static generating conditions but the value of capacitor C6 must be small enough as to not completely attenuate the alternator ripple voltage.

VCC is supplied to first and second timer pins 4, 10 and 14, amplifiers 34, 36, 37, and 38 pin 4. VDD is supplied to first and second timer pin 7, amplifiers 34, 36, 37 and 38 pin 11.

The alarm 43 is encased in a enclosure which provides an opening (a sound cavity) for the piezo alarm 48. Also a second opening is provided to allow a pair of wires to be connected to lighting circuit 44.

Table II lists component values used in the preferred embodiment of FIG. 2.

TABLE II

| announciator 48 | piezo alarm |
|---|---|
| R1 | 220K ohms |
| R2 | 120K ohms |
| R3 | 1 Meg ohms |
| R5 | 5 Meg ohms |
| R6 | 1 Meg ohm |
| C1 | 10 uf |
| C2 | 10 uf |
| C3 | 0.1 uf |
| C6 | 100 uf |
| first timer 35, second timer 40 | LM 556 |
| amplifiers 34 and 36 | LF 347 |
| diodes D3 thru D10 | IN4001 |

CONCLUSION

The present invention is a low cost headlight warning device which can be easily installed in a plurality of locations in an existing automobile lighting circuit. To facilitate the connection of the device solderless connectors of the insulation displacement type are used. The installation is further simplified as the testing for the correct voltage polarity is not required. Also the device monitors the alternator ripple voltage to determine if the engine is running or not, this results in a device which requires no calibration. The device has its own built in annunciator to alert the driver that the lights are on while the engine is off. Although the preferred embodiments of the present invention have been shown and described herein, those skilled in the art will recognize that the scope of the invention should be determined not by the embodiments illustrated, but by the appended claims and their legal requirements.

I claim:

1. A warning apparatus for use in an automobile which includes an automobile lighting circuit having headlight and parking light circuits, a headlight switch for controlling the lighting circuit, a battery, and an alternator for recharging said battery, said warning apparatus alerting a driver that said lighting circuit is energized while the engine is off, wherein said warning apparatus comprises:
   a) a voltage nondiscriminatory means connecting said warning apparatus to said lighting circuit without regard to voltage polarity present in said lighting circuit,
   b) a monitor means to detect alternator ripple voltage generated by operation of the alternator, whereby the presence of the alternator ripple voltage is indicative that said engine is on, c) a timing means connected to said monitor means to cause energization of an annunciator for a predetermined time period to alert said driver of said automobile that said engine is off and said lighting circuit is energized.

2. The warning apparatus of claim 1, wherein said voltage nondiscriminatory means is a diode bridge circuit.

3. The warning apparatus of claim 1, wherein said monitor means is a high gain solid state amplifier, and a capacitor couples said alternator ripple voltage to said amplifier.

4. The warning apparatus of claim 1 wherein said timing means is connected to said annunciator.

* * * * *